United States Patent [19]
Johnson

[11] 4,193,188
[45] Mar. 18, 1980

[54] FLEXIBLE SAW

[76] Inventor: Robert M. Johnson, 11 Jana Dr., Weston, Conn. 06883

[21] Appl. No.: 947,017

[22] Filed: Sep. 29, 1978

[51] Int. Cl.² .............................................. B23D 45/00
[52] U.S. Cl. .................................. 30/166 R; 145/31 R
[58] Field of Search .......................... 30/166 R, 355; 145/31 R, 31 AB, 31 AC

[56] References Cited

U.S. PATENT DOCUMENTS

| 2,696,228 | 12/1954 | Bowen | 30/166 R |
| 2,752,964 | 7/1956 | Prusinski | 145/31 R |
| 3,747,652 | 7/1973 | Meadows | 145/31 R |

FOREIGN PATENT DOCUMENTS

| 954370 | 6/1949 | France | 30/166 R |
| 41720 | 11/1907 | Switzerland | 30/166 R |

Primary Examiner—Othell M. Simpson
Assistant Examiner—J. T. Zatarga

[57] ABSTRACT

This invention pertains to means for and a method of trimming branches of trees and particularly branches high above the ground, by means of spaced cutting collars with sharp teeth at one end crimped upon a flexible cable, without using a pole saw, climbing the tree, or using a ladder. Means are also provided in the form of lead weights, sand bags, etc., to carry the flexible cutting table into position over the branch desired to be cut.

1 Claim, 3 Drawing Figures

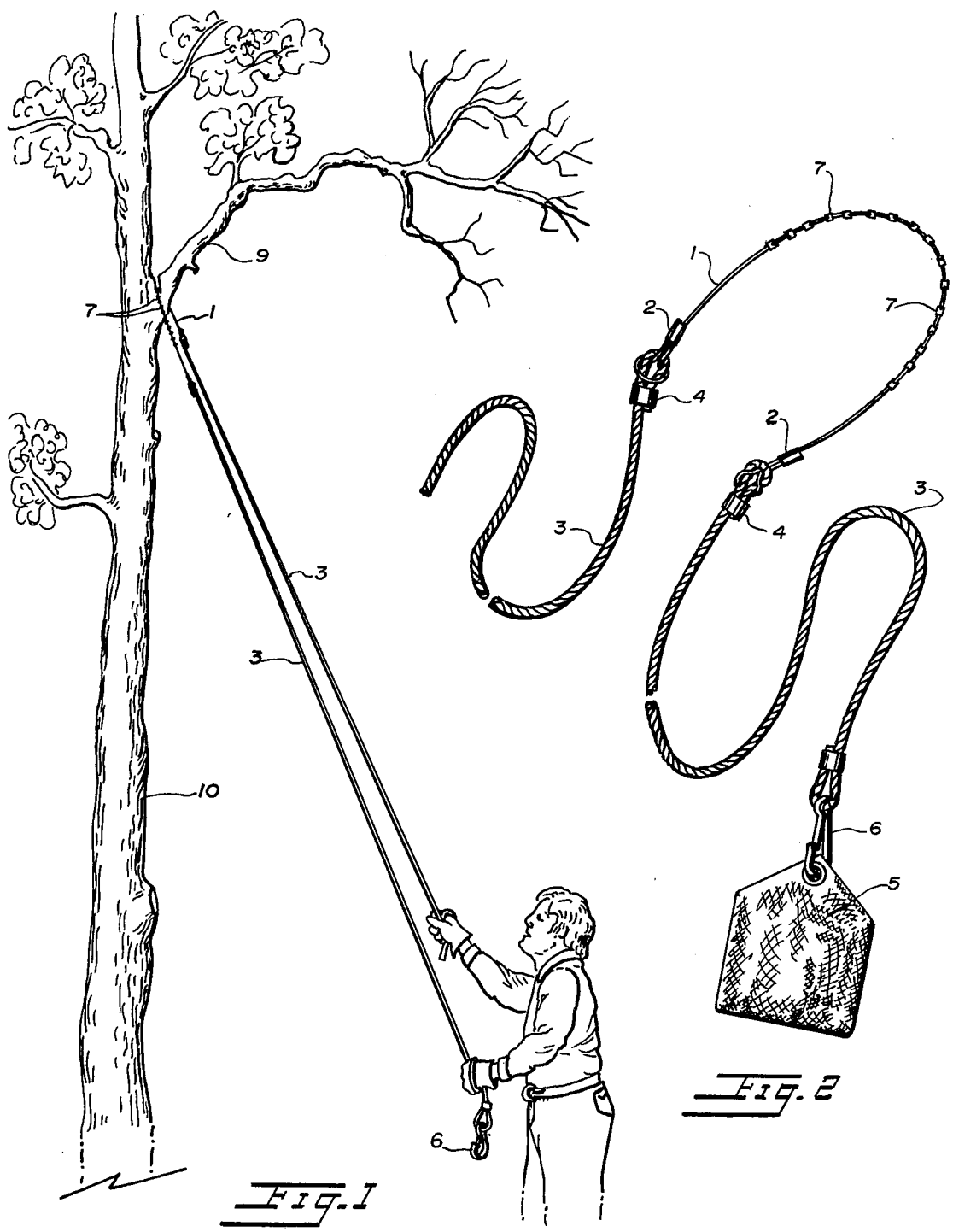
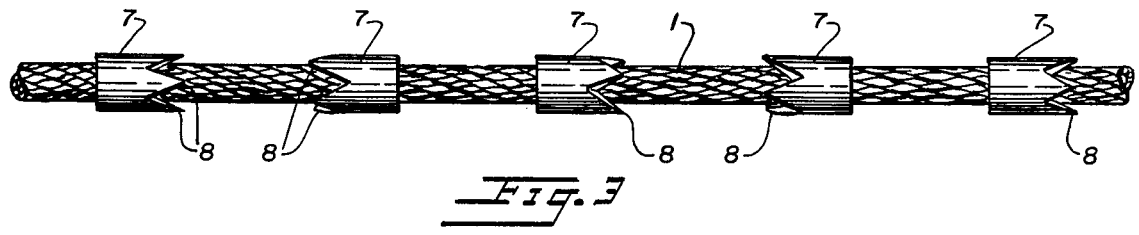

FLEXIBLE SAW

This invention pertains to means for and a method of trimming branches of trees and particularly branches high above the ground, by means of spaced cutting collars with sharp teeth at one end fastened upon a flexible cable, without a pole saw, climbing the tree or using a ladder. Means are also provided in the form of metal weights, sand bag, etc. to carry the flexible cutting cable into position over the branch desired to be cut.

Referring to the drawing broadly:

FIG. 1 illustrates my cutting assembly in operation on a tree.

FIG. 2 is a detail view of the complete sawing mechanism together with the throwing and positioning weight.

FIG. 3 shows the details of the unique cutting collars.

The primary purpose of this invention is to reach and saw through tree branches which are too high for conventional sawing methods, i.e., pole saws, power and hand saws used in conjunction with ladders or with tree climbing.

The main body of the cutting blade is preferably constructed from flexible stranded wire cable 1. The diameter of this cable or wire rope can vary. However 1/16" seems to be the most practical and satisfactory for most operations. The length of the cable also can vary but about 3 feet seems best for most cutting jobs. Both ends of the cable are doubled back and with the use of crimps 2, a loop about 1½ inch is formed at each end to which control ropes 3 of polypropylene, hemp, nylon, or other suitable material are attached in any suitable manner such as with similar looped ends crimped by elements 4, or other fastening elements.

These ropes 3 serve as flexible handles. The length of the two control ropes also can vary depending on the normal height of the offending tree branches above the ground. At the end of one control rope, a temporary weight 5 of approximately 13 to 16 ounces is attached by means of a snap 6 or other fastner so as to detachably hold the weight hereto. The weight may be a bag of sand or lead pellets, solid block of metal or lead or other relatively heavy substance.

The size, type, and configuration and number of collars 7, and of its special saw teeth 8, are a very important part of my invention. For best results the collars are 0.125' long, have an outside diameter of 0.122" and an inside diameter of 0.068". 22 gauge 1018 carbon cold drawn steel tubing, 12L14, or equivalent is best. The tubing end is shaped by means of files, or otherwise cutting, to form two V-shaped grooves cut at a 60° angle to each other and forming 4 sharply pointed and tapered teeth. The length of tubing is cut off at about ⅛-3/32" (0.125-0.1875") from the pointed ends of the teeth and is then ready to be strung and swaged to the 1/16" cable.

The collars are crimped onto the cable, back to back and points to points as shown in FIG. 3 with a space of approximately ¼-⅜" between cutting collars. Two teeth constitute a set since each tooth will cut when drawn in the forward direction toward which that tooth faces, while the back edge of the other tooth is cleared of sawdust. Hence my flexible saw will cut in both backward and forward i.e. up and down, strokes.

The number of cutting collars, and the length of cable and control ropes used may be varied within limits depending upon the height above ground of the branches to be cut off, thickness of branches, etc. For example, for the homeowner's model for branches nearer the ground and 4" or less in diameter, each control rope is 25' long, and the cable is 3' long with 40 cutting collars thereon spread over the central 14½", for a total length of 53'. The professional model has control ropes of 35', and a cable length of 5' with 100' teeth thereon, for a total length of 75'. Obviously slightly larger teeth may be used for the heavier cutting if desired. The only limitation to the height of cutting is how far the rope can be thrown over the particular branch.

Method of Use: Once the branch 9 on tree 10 has been selected to be cut, the weight 5 at one end of the control rope is cast up and over the branch. With one control rope in either hand the saw blade is then pulled up and onto the branch. Once the blade saw is positioned the weight may be removed. Now by pulling alternately on both control ropes the blade is pulled back and forth over the branch. With each pass, the cutting teeth take their bite—until the branch 9 has been sawed through.

As mentioned above, the size and positioning of the teeth is very important. Preferably two sets of teeth should not be in contact with the branch at the same time or binding may sometimes occur. Thus, different saw blades with different teeth spacing are recommended for different diameter branches. The thicker the branch, the further apart the teeth should be positioned for optimum cutting. Obviously teeth could be formed on each end of the collars if so desired.

While the preferred form of my invention involves a cable with separate cutting collar crimped thereto and specifically to cut high tree branches, it is within the spirit of claims of my invention to cut any object, and to use less efficient cutting instrumentalities. Among these would be a cable covered with a resinous adhesive, and then coated with sharp abrasive particles, such as silicon dioxide, aluminum oride, or other cutting points secured to the basic cable.

I claim:

1. A flexible saw for sawing high branches from trees comprising a flexible cutting area, and flexible holding means on each end of the flexible cutting area to oscillate the cutting area against a branch of a tree to be cut, and wherein said cutting area comprises a base and a series of spaced apart cutting means secured thereto, and wherein said base is a cable and the cutting means are collars frictionally secured thereon and having sharp points solely on one end thereof, and wherein said cutting area cable has loops formed thereon at each end, and generally similar loops formed on one end of each of the holding means whereby said cutting area and said holding means are permanently secured together, and a weight detachably attached to an opposite end of only one holding means, and wherein said cable is metal, and said collars are metal and are positioned on said cable with sharp points on one end of each collar and a smooth surface on the opposite end of each collar, the sharp points of every other collar facing toward one end of the cable and the sharp points of collars in between every other collar facing toward the opposite end of the cable such that the ends of collars having the sharp points face each other and the ends of collars having the smooth surface face each other, and wherein the holding means is made of plastic and is longer than the cutting area cable, and wherein said sharp points form teeth, and the outside diameter of the collars are in the range of 0.110–0.132", the inside diameter between 0.058–0.078", the length from ⅛–⅜", and the teeth formed at a 60° angle to each other thereby forming 4 teeth on the cutting end of each collar, and wherein the length of the cable is in the range of 30–70", and 35–100 cutting collars are equally spaced ¼–½" apart starting from the mid-point of the length of the cable and extending towards its outer ends.

* * * * *